United States Patent [19]
Terashita et al.

[11] Patent Number: 5,850,273
[45] Date of Patent: *Dec. 15, 1998

[54] LIQUID CRYSTAL DISPLAY DEVICE, METHOD AND APPARATUS FOR FABRICATING THE SAME

[75] Inventors: Shin-Ichi Terashita, Tenri; Nobuaki Yamada, Higashiosaka; Takako Adachi; Akihiro Nammatsu, both of Tenri; Seiji Makino, Nara; Shigeaki Mizushima, Ikoma, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 711,912

[22] Filed: Sep. 12, 1996

[30] Foreign Application Priority Data

Sep. 13, 1995 [JP] Japan ................................ 7-235740

[51] Int. Cl.$^6$ .......................... G02F 1/1337; G02F 1/141
[52] U.S. Cl. ...................... 349/129; 123/124; 123/125; 123/128; 123/130; 131/132; 131/133; 131/134; 131/135
[58] Field of Search .................................... 349/125, 187, 349/123, 136, 124, 128, 129, 130, 131, 132, 133, 134, 135

[56] References Cited

U.S. PATENT DOCUMENTS

| | | | |
|---|---|---|---|
| 3,989,354 | 11/1976 | Dubois et al. | 349/131 |
| 5,029,987 | 7/1991 | Shinomiya | 349/128 |
| 5,594,570 | 1/1997 | Hirata et al. | 349/129 |
| 5,602,683 | 2/1997 | Straaijer et al. | 359/811 |

OTHER PUBLICATIONS

N. Watanabe et al., Method for Fabricating Liquid Crystal Display Device, Japanese Laid–Open Patent Publication #7–64087, Pub. Date Mar. 10, 1995.

Y. Koike et al., Liquid Crystal Display Device, Japanese Laid–Open Patent Publication #5–210099, Pub. Date Aug. 20, 1993.

T. Kamata et al., Method For Fabricating Liquid Crystal Display Panel, Japanese Laid–Open Patent Publication #7–209646, Pub. Date Aug. 11, 1995.

*Primary Examiner*—William L. Sikes
*Assistant Examiner*—Julie Ngo
*Attorney, Agent, or Firm*—David G. Conlin; William J. Daley, Jr.

[57] ABSTRACT

A liquid crystal display device includes: a first substrate; a second substrate; a liquid crystal layer interposed between the first and the second substrates; a plurality of electrodes for applying a voltage to the liquid crystal layer; a first alignment film provided on a surface of the first substrate in contact with the liquid crystal layer; a second alignment film provided on a surface of the second substrate in contact with the liquid crystal layer; and a plurality of pixels. The liquid crystal layer in each of the pixels includes first and second liquid crystal regions, liquid crystal molecules in the first and the second liquid crystal regions have an identical twisting direction. Pretilt angles of liquid crystal molecules in the first alignment region and the second alignment region on the first and the second alignment films differ from each other, and the liquid crystal display device is fabricated by a method including the step of irradiating light onto a predetermined area of each of the first and the second alignment films in a gas containing an organic compound.

18 Claims, 10 Drawing Sheets

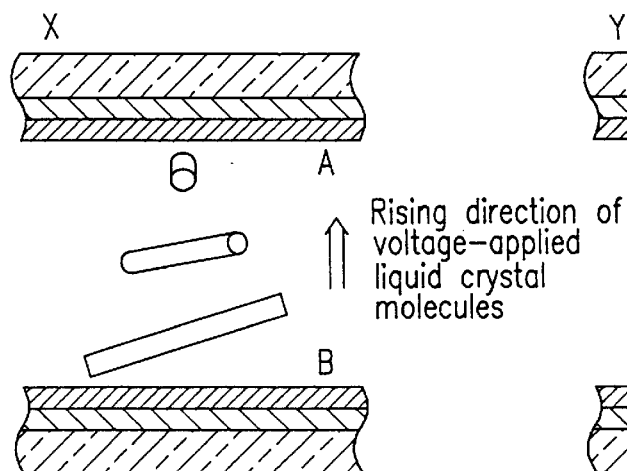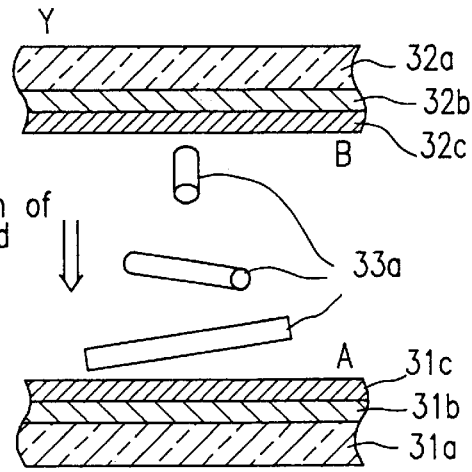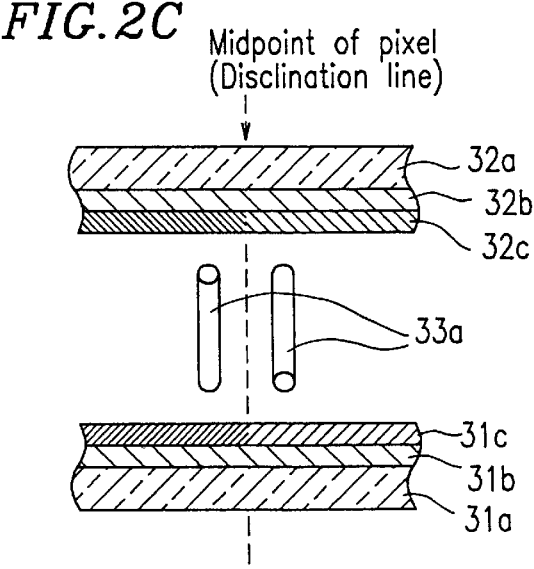

R₁ Alkyl group
X₁ Optically cleavable group

R₂  Alkyl group
Y₁  Optically active functional group
*Y₁  Optically excited functional group

LIQUID CRYSTAL DISPLAY DEVICE, METHOD AND APPARATUS FOR FABRICATING THE SAME

BACKGROUND OF THE INVENTION

1. Field of the Invention

The present invention relates to a liquid crystal display device used for a large-screen display apparatus, a vehicular electronic display for displaying navigation information, a lap-top computer and the like, and more particularly to a liquid crystal display device of a wide viewing angle display mode. The present invention further relates to a method and an apparatus for fabricating such a liquid crystal display device.

2. Description of the Related Art

A liquid crystal display device having superior characteristics such as a light weight, a small thickness, a low power consumption and the like has been developed for a use in the field of office automation, audio-visual apparatuses and the like as a key device in the on-coming multi-media era. There has been an increasing demand for such a liquid crystal display device having excellent visual characteristics and a high contrast ratio.

As such a liquid crystal display device, one including thin film transistors (TFTs) as switching elements has been known. A TN (twisted nematic) display mode where liquid crystal molecules are twisted by 90° and sandwiched between a pair of electrode substrates, or an STN (super-twisted nematic) display mode where liquid crystal molecules are twisted by 180° or more is generally employed for the liquid crystal display device.

In the liquid crystal display device, the pair of substrates interposing a liquid crystal layer each include an alignment film provided thereon in contact with the liquid crystal layer. The alignment films are subjected to a rubbing treatment so that liquid crystal molecules on the alignment films are unidirectionally aligned.

However, the liquid crystal display device of a TN or STN display mode has a problem of a narrow viewing angle. This disadvantageous viewing angle characteristic results from the display principle employed in these modes. The liquid crystal display device of a TN or STN display mode has a viewing angle dependence because the liquid crystal molecules in the middle of the liquid crystal layer in its thickness direction are tilted in a certain direction. In this specification, this tilt direction defined in a substrate plane is referred to as a reference viewing direction. Therefore, when the viewing angle is inclined from the substrate normal toward the reference viewing direction (i.e., a positive viewing direction), the display is viewed with high contrast but a contrast inversion adversely occurs at an intermediate grayscale. On the other hand, when a view point is in a direction 180° opposite to the positive viewing direction, the display is viewed with low contrast. Thus, these display modes provide only a limited viewing angle from which desirable display characteristics can be obtained.

In order to improve the viewing angle characteristics, new display modes have been proposed. For example, Japanese Laid-Open Patent Publication No. 7-64087 discloses a liquid crystal display device having a similar configuration to that shown in FIG. 1. In the liquid crystal display device, alignment films 31c and 32c are irradiated with UV (ultraviolet) light while a portion of each pixel is masked with a photomask. Thus, the anchoring strength for liquid crystal molecules 33a on the irradiated portions of the alignment films 31c and 32c is weakened, thereby reducing the pretilt angle thereof. On the other hand, the portions opposing the irradiated portions are not irradiated with UV rays. Thus, the anchoring strength thereof remains strong, thereby having relatively high pretilt angle of the liquid crystal molecules thereon. Two liquid crystal regions X and Y having different orientations are formed in a pixel. The orientation of liquid crystal molecules in the region to be regulated by the alignment film on the upper substrate and that in the region to be regulated by the alignment film on the lower substrate differ from each other so that these regions have opposite reference viewing directions. Specifically, the orientations of the liquid crystal molecules 33a in the liquid crystal regions X and Y are opposite to each other, thereby creating two opposite positive viewing directions (e.g., the 6 o'clock direction and the 12 o'clock direction) for each pixel. Thus, a wide viewing angle display mode is realized where disadvantageous viewing angle characteristics of each liquid crystal region X and Y are compensated for the other. This method or structure for improving the viewing angle characteristics is referred to as a pixel division method or structure.

However, such a liquid crystal display device exhibits a high propensity to generate remaining images as observed through a high-temperature operation test. The remaining images means a phenomenon that a previous image is superimposed on a present image.

As the inventors of the present invention researched the cause of the remaining images, the following has been elucidated. When an alignment film is irradiated with high-energy light (e.g., UV rays having a short wavelength) in an oxygen atmosphere, functional groups on the alignment film which influence the pretilt angle are cleaved therefrom. Moreover, oxygen in the atmosphere absorbs UV rays having a short wavelength (i.e., about 350 nm or less), thereby generating ozone and active oxygen. The ozone and the active oxygen oxidize the surface of the alignment film. This oxidization along with the cleavage of functional groups result in chemical structures (e.g., functional groups having a strong polarity) formed on the alignment film. These chemical structures deteriorate the electrical characteristics of the display device. As a result, the liquid crystal display device having the alignment film produced by the above-described method exhibits a high propensity to generate remaining images when operated at a high temperature. The propensity to generate remaining images can be quantified based on: a direct current voltage of a voltage applied to a common transfer (i.e., a transfer); i.e, an offset voltage (the amount of Vcdc voltage)

A common transfer is a member which connects a common terminal provided on an active matrix substrate to a common electrode (a counter electrode) formed on a counter substrate which opposes the active matrix substrate via a liquid crystal layer. Generally, a common transfer is made of carbon paste. In the case of an active matrix type liquid crystal display device, the voltage applied to the liquid crystal layer equals the difference between the potential of pixel electrodes and the potential of common electrodes. The voltage to be applied to the common transfer is supplied to the common electrodes (though, in a strict sense the voltage drops in the common transfer). Therefore, the voltage applied to the common transfer may be regarded as the reference potential of the voltage applied to the liquid crystal layer. In general, an alternating current voltage, where polarities alternately change, is applied to the common transfer (common inversion driving method) in order to prevent the liquid crystal material from being deteriorated by a direct current voltage. Moreover, a direct current voltage Vcdc (offset voltage: a voltage which shifts the center level of a voltage applied to a common transfer), being superimposed over the above alternating current signal, is applied to the common transfer in order to compensate asymmetry with respect to polarities of the applied voltage in the voltage-transmittance characteristic of the liquid crystal layer (or pixels).

When the liquid crystal display device is subjected to a high-temperature operation test, the direct current voltage Vcdc needs to be shifted in order to perform a normal display where remaining images are not observed. The amount of Vcdc shift can be measured as follows.

For example, while keeping the TFT gate in an ON state by applying a voltage of about ±10 V, 30 Hz to the gate electrode, a source voltage of about ±3 V, 30 Hz is applied to the source electrode. The liquid crystal display device is kept in the above state at about 70° C. for about two hours to obtain the least amount of Vcdc shift required for realizing a display where remaining images are not observed. The larger the amount of Vcdc shift, the higher the propensity of the liquid crystal display device to generate remaining images. The "amount of Vcdc shift" used hereinafter in this specification is the value obtained in the above condition.

In the above description, the amount of Vcdc shift has been defined in the case of an active matrix type liquid crystal display device, however, the same definition applies to the case of a passive matrix type liquid crystal display device. Vcdc is a direct current voltage which determines the center level of an alternating current signal applied to a liquid crystal layer.

FIG. 10 shows a relationship between a pretilt angle and an amount of Vcdc shift in the case where the alignment film is UV-irradiated in an oxygen atmosphere. As can be appreciated from FIG. 10, the amount of Vcdc shift increases as the pretilt angle deceases.

Accordingly, there is no appropriate UV irradiation condition where a reduced pretilt angle for a desirable pixel division coexists with a reduced amount of Vcdc shift such that remaining images are not observed in a high-temperature operation test. Remaining images or an inappropriate pixel division result in a critical problem which deteriorates the performance of the liquid crystal display device. Therefore, a solution is sought. On the other hand, in the case where the alignment films are UV-irradiated in an atmosphere of an inert gas such as nitrogen, helium, neon or argon, a reaction which reduces the pretilt angle is not well promoted. Accordingly, a desirable pixel division line is not obtained.

SUMMARY OF THE INVENTION

A liquid crystal display device of this invention includes: a first substrate; a second substrate; a liquid crystal layer interposed between the first substrate and the second substrate; a plurality of electrodes for applying a voltage to the liquid crystal layer; a first alignment film provided on a surface of the first substrate in contact with the liquid crystal layer; a second alignment film provided on a surface of the second substrate in contact with the liquid crystal layer; and a plurality of pixels. The liquid crystal layer in each of the pixels includes first and second liquid crystal regions, liquid crystal molecules in the first and the second liquid crystal regions have an identical twisting direction. Pretilt angles of liquid crystal molecules on the first and the second alignment films in the first liquid crystal region and the second liquid crystal region differ from each other, the smaller pretilt angle being about 0.5° or less, and an amount of Vcdc shift of electric characteristics of the liquid crystal display device is about 0.3 V or less.

In one embodiment of the invention, the first alignment film includes first and second alignment portions providing liquid crystal molecules with pretilt angles different from each other, the pretilt angle of the liquid crystal molecules on the first alignment portion being about 0.5° or less. The second alignment film provides liquid crystal molecules with a single predetermined pretilt angle. A first liquid crystal region is formed between the first alignment portion and the second alignment film, and a second liquid crystal region is formed between the second alignment portion and the second alignment film.

In another embodiment of the invention, the first alignment film includes first and second alignment portions providing liquid crystal molecules with pretilt angles different from each other, the pretilt angle of the liquid crystal molecules on the first alignment portion being about 0.5° or less. The second alignment film includes third and fourth alignment portions each giving liquid crystal molecules thereon pretilt angles different from each other, the pretilt angle of the liquid crystal molecules on the third alignment portion being about 0.5° or less. A first liquid crystal region is formed between the first alignment portion and the fourth alignment portion, and a second liquid crystal region is formed between the second alignment portion and the third alignment portion.

According to another aspect of the invention, a liquid crystal display device includes: a first substrate; a second substrate; a liquid crystal layer interposed between the first and the second substrates; a plurality of electrodes for applying a voltage to the liquid crystal layer; a first alignment film provided on a surface of the first substrate in contact with the liquid crystal layer; a second alignment film provided on a surface of the second substrate in contact with the liquid crystal layer; and a plurality of pixels. The liquid crystal layer in each of the pixels includes first and second liquid crystal regions. Liquid crystal molecules in the first and the second liquid crystal regions have an identical twisting direction, pretilt angles of liquid crystal molecules in the first alignment region and the second alignment region on the first and the second alignment films differ from each other, and the liquid crystal display device is fabricated by a method including the step of irradiating light onto a predetermined area of each of the first and the second alignment films in a gas containing an organic compound.

In one embodiment of the invention, the light irradiation step is conducted under an air pressure in a range of about 0.5 to about 1 atm.

In another embodiment of the invention, the organic compound is one selected from the group consisting of a lower alcohol, primary amine, carboxylic acid, halogenated alkyl, and a silane coupling agent.

In still another embodiment of the invention, the light irradiation step is conducted using light having a wavelength of about 350 nm or less.

In still another embodiment of the invention, each of the irradiated areas of the first and the second alignment films provides liquid crystal molecules with a pretilt angle of about 0.5° or less.

According to still another aspect of the invention, a method for fabricating a liquid crystal display device comprising: a first substrate; a second substrate; a liquid crystal layer interposed between the first and the second substrates;

a plurality of electrodes for applying a voltage to the liquid crystal layer; a first alignment film provided on a surface of the first substrate in contact with the liquid crystal layer; a second alignment film provided on a surface of the second substrate in contact with the liquid crystal layer; and a plurality of pixels. The liquid crystal layer in each of the pixels includes first and second liquid crystal regions. Liquid crystal molecules in the first and the second liquid crystal regions have an identical twisting direction, and a pretilt angle of liquid crystal molecules in the first liquid crystal region and the second liquid crystal region on the first and the second alignment films differ from each other. The method comprises the step of irradiating light onto a predetermined area of each of the first and the second alignment films in a gas containing an organic compound.

According to still another aspect of the invention, an apparatus for fabricating a liquid crystal display device includes: a chamber for accommodating a substrate of the liquid crystal display device and a gas supplying section for supplying a gas containing an organic compound into the chamber. The chamber includes: a holding section for holding the substrate and a light transmitting section for externally leading light onto the substrate placed on the holding section.

In one embodiment of the invention, the light transmitting section transmits light having a wavelength of about 350 nm or less therethrough.

In another embodiment of the invention, the apparatus further includes a photomask between the light transmitting section and the holding section, wherein the photomask includes at least one of a hole passing therethrough and a groove running thereon for leading the gas to the substrate placed on the holding section.

Thus, the invention described herein makes possible the advantages of (1) providing a liquid crystal display device capable of realizing a reduced pretilt angle and a reduced amount of Vcdc shift; and (2) providing a method and an apparatus for fabricating such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIGS. 2A to 2C are schematic views particularly showing liquid crystal regions in a pixel of the liquid crystal display device shown in FIG. 1;

DESCRIPTION OF THE PREFERRED EMBODIMENTS

Hereinafter, the present invention will be described by way of illustrative examples with reference to the accompanying figures.

Figure 1:
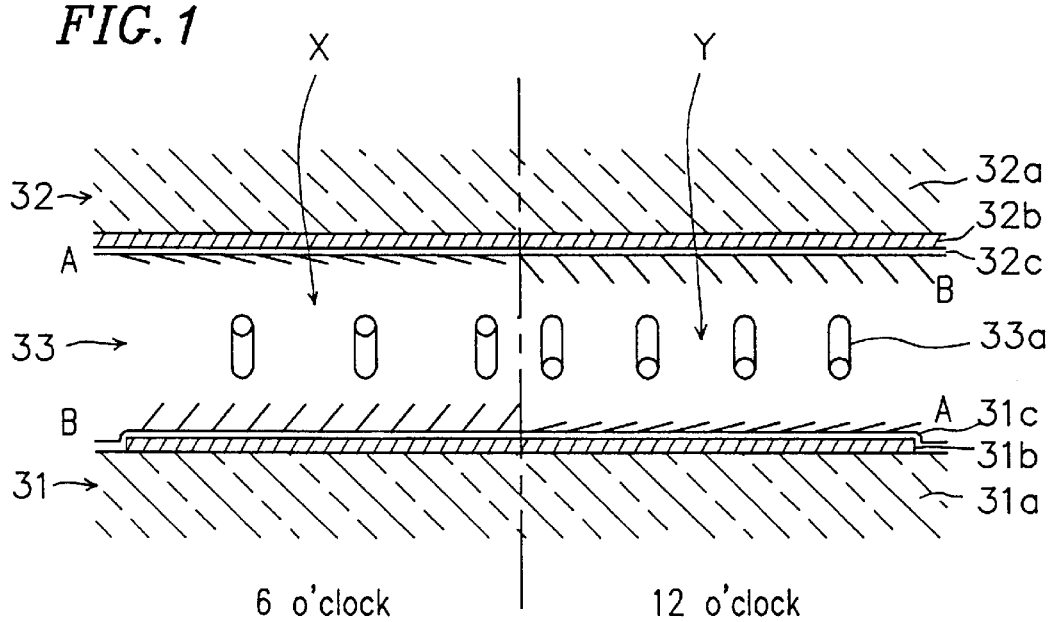
FIG. 1 is a cross-sectional view of an active matrix type liquid crystal display device corresponding to one pixel according to an example of the present invention.

FIG. 1 is a cross-sectional view of a liquid crystal display device according to the present invention. The liquid crystal display device is an active matrix type liquid crystal display device having switching elements such as MIMs (Metal-Insulator-Metal) or TFTs. The liquid crystal display device includes a pair of substrates 31 and 32 opposing each other with a liquid crystal layer 33 interposed therebetween. In the (lower) substrate 31, an electrode layer 31b which includes a plurality of pixel electrodes is formed on a base substrate 31a made of glass, a silicon wafer or the like. An alignment film 31c for defining the alignment of liquid crystal molecules 33a is provided on the electrode layer 31b so as to be in contact with the liquid crystal layer 33. The plurality of pixel electrodes in the electrode layer 31b provided on the substrate 31 are formed in a matrix.

The other (upper) substrate 32 includes a base substrate 32a made of glass, a silicon wafer or the like, an electrode layer (a common electrode) 32b provided on the base substrate 32a, and an alignment film 32c for defining the alignment of liquid crystal molecules 33a provided in contact with the liquid crystal layer 33. The plurality of pixel electrodes, the electrode layer 31b and the electrode layer (common electrode) 32b form a plurality of pixels. In the case of a passive type liquid crystal display device, the electrode layer 31b provided on the substrate 31 and the electrode layer 32b provided on the substrate 32 are formed in such a manner that a plurality of strip-shaped electrodes are juxtaposed. The strip-shaped electrodes of the electrode layer 31b and the strip-shaped electrodes of the electrode layer 32b are provided respectively on the substrates 31 and 32 so as to cross each other. A crossing portion of each strip-shaped electrode of the electrode layer 31b and each strip-shaped electrode of the electrode layer 32b forms a pixel.

The pair of liquid crystal regions X and Y are provided for each pixel in the liquid crystal layer 33. The orientations of liquid crystal molecules 33a in the liquid crystal regions X and Y differ from each other. The liquid crystal region X has a reference viewing direction in the 6 o'clock direction, and the liquid crystal region Y has a reference viewing direction in the 12 o'clock direction.

In FIG. 1, short lines extending from the alignment films 31c and 32c represent the liquid crystal molecules 33a in contact with the alignment films 31c and 32c. The tilting of the liquid crystal molecules 33a in the vicinity of the middle position along the thickness direction of the liquid crystal layer 33 indicates the average pretilt direction of the liquid crystal molecules 33a. Regions of a smaller angle on the alignment films 31c and 32c are each referred to as an A-alignment portion on which liquid crystal molecules 33a have a relatively small pretilt angle, and regions of a larger angle on the alignment films 31c and 32c are each referred to as a B-alignment portion on which liquid crystal molecules 33a have a relatively large pretilt angle. The viewing angle dependence of the display characteristics greatly varies depending on the pretilt direction of the liquid crystal molecules 33a in the middle of the liquid crystal layer 33. Therefore, the pretilt directions being projected onto the liquid crystal layer surface are each referred to as the reference viewing direction (the 6 o'clock direction and the 12 o'clock direction) of the liquid crystal regions X and Y. For example, as shown in FIG. 1, liquid crystal molecules 33a in the liquid crystal regions X and Y have the same twisting direction. However, the arrangements of the A-alignment portion and the B-alignment portion are opposite (upside down) in the liquid crystal regions X and Y. In other words, in the region X, the A-alignment portion and the B-alignment portion are provided respectively on the upper substrate 32 and the lower substrate 31, and in the region Y, the A- and B-alignment portions are provided respectively on the lower and the upper substrates 31 and 32. Therefore, the liquid crystal regions X and Y have reference viewing directions different from each other by 180°. The alignment films 31c and 32c both have an A-alignment portion and a B-alignment portion provided thereon so as to oppose each other in each of the liquid crystal regions X and Y. The A-alignment portion is irradiated with UV rays, whereas the B-alignment portion is masked so as not to be irradiated with UV rays. Liquid crystal molecules 33a in the liquid crystal regions X and Y have the same twisting direction in each pixel. The end portions of the substrates 31 and 32 are sealed with a resin or the like. On at least one of the substrates 31 and 32, a peripheral circuit such as a driving circuit is externally mounted at the periphery of a display section which performs a display.

Such a configuration realizes a liquid crystal alignment mode in which each pixel is divided into two regions so that the viewing angle characteristics of each region are compensated for the other. Accordingly, a desirable pixel division can be realized.

FIGS. 2A and 2B schematically show the orientations of liquid crystal molecules 33a in the respective liquid crystal regions X and Y in each pixel of the liquid crystal display device according to the present invention. The liquid crystal molecules 33a have the same twisting angle in each of the two regions X and Y and have a boundary therebetween at the midpoint of each pixel. As shown in FIG. 2C, when a voltage is applied to liquid crystal regions X and Y having such a configuration, a disclination line appears along the boundary, but not inside the liquid crystal regions X and Y. Therefore, high contrast can be realized in the liquid crystal display device of a TN display mode.

The B-alignment portion has a greater anchoring strength for liquid crystal molecules 33a than the A-alignment portion, and therefore, the pretilt angle of liquid crystal molecules 33a thereon is also greater. Therefore, when a voltage is applied to the liquid crystal display device having such alignment films 31c and 32c, liquid crystal molecules 33a rise to such directions as to further increase the pretilt angle of liquid crystal molecules 33a on the B-alignment portion. In other words, liquid crystal molecules 33a in the liquid crystal regions X and Y are realigned respectively in the counterclockwise and the clockwise directions as indicated by arrows in FIGS. 2A and 2B. As shown in a cross-sectional view of FIG. 2C, the liquid crystal molecules 33a rise symmetrically about the central axis of the pixel, whereby the two regions X and Y in the same liquid crystal layer have opposite reference viewing directions. Thus, a viewer sees the display with two reference viewing directions. In other words, a contrast inversion which occurs when a viewer sees the display in a direction inclined from the substrate normal toward the reference viewing direction (positive viewing direction) and a considerable contrast drop which occurs when a viewer sees the display in the direction opposite the positive viewing direction are alleviated. Thus, the apparent refractive index becomes uniform in every direction, thereby improving the viewing characteristics of the liquid crystal display device (see FIG. 1).

The liquid crystal display device having such characteristics can be obtained owing to the presence of the A-alignment portion and the B-alignment portion. The UV irradiation for such a liquid crystal display device is conducted, for example, as follows. The alignment films are UV-irradiated in a gas atmosphere obtained by vaporizing an organic compound in air or an inert gas, or in a gas atmosphere where an organic compound previously applied to a substrate or a photomask is volatilized. In accordance with the method, changes of functional groups on the surface of the alignment film which cause remaining images can be depressed, while a photochemical reaction of the functional groups which reduces the pretilt angle can be promoted. Accordingly, a desirable pixel division is realized, whereby it is possible to attain a wide viewing angle display quality while remaining images are not observed in the above-mentioned high-temperature operation test.

Figure 11A:
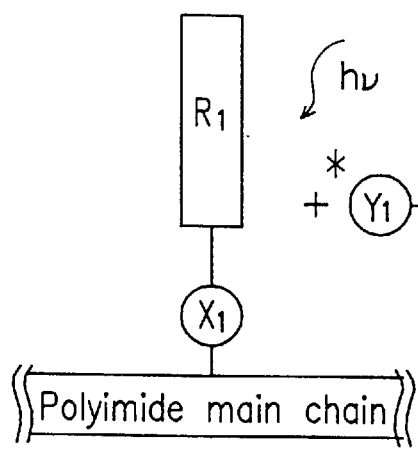
FIGS. 11A and 11B are schematic views illustrating a mechanism of a photochemical reaction during a UV irradiation of the present invention.
Figure 11B:
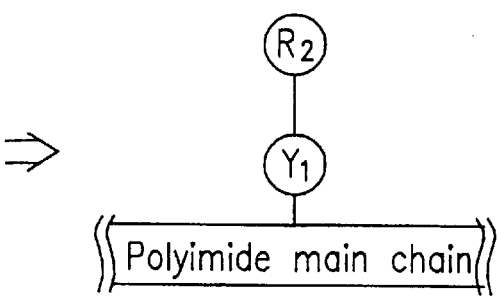

Now, the mechanism of the above-mentioned photochemical reaction will be described. As shown in FIG. 11A, a polyimide film having an alkyl group $R_1$ capable of keeping a pretilt angle of liquid crystal molecules in the range of about 4° to about 5° via a optically cleavable group $X_1$ as a side-chain is UV-irradiated in an atmosphere where an organic compound $Y_1$—$R_2$ exists. As a result, as shown in FIG. 11B, the $X_1$—$R_1$ compound is cleaved from the polyimide and the activated $Y_1$—$R_2$ compound is bonded thereto.

As the organic compound $Y_1$—$R_2$, an alcohol, especially a lower alcohol such as ethanol, methanol and propanol; primary amine; carboxylic acid; halogenated alkyl (e.g., chloroform or methylene iodide); or a silane coupling agent (e.g, aminoalkylsilane or epoxyalkylsilane) can be used. Preferably, the organic compound is volatile. As analyzed through a Fourier Transformation Infrared (FT-IR) spectroscopy (Nippon Bio-Rad Laboratories), these compounds depressed the increase of an infrared absorption band of about 1600 $cm^{-1}$ relevant to remaining images, and reduced a band of about 2950 $cm^{-1}$ relevant to the pretilt angle of liquid crystal molecules. In other words, the compounds exhibited an effect in depressing a photodecomposition reaction which results in remaining images, and promoted a photochemical reaction which reduces a pretilt angle of liquid crystal molecules.

The irradiated alignment films were further surface-analyzed as follows. Polyimide alignment films were deposited on a silicon substrate or a metal-deposited substrate, and then the alignment films were irradiated with UV rays from a high-pressure mercury lamp respectively in air, nitrogen and mixed gas (ethanol+nitrogen) atmospheres, and then surface-analyzed by FT-IR.

Figure 3:
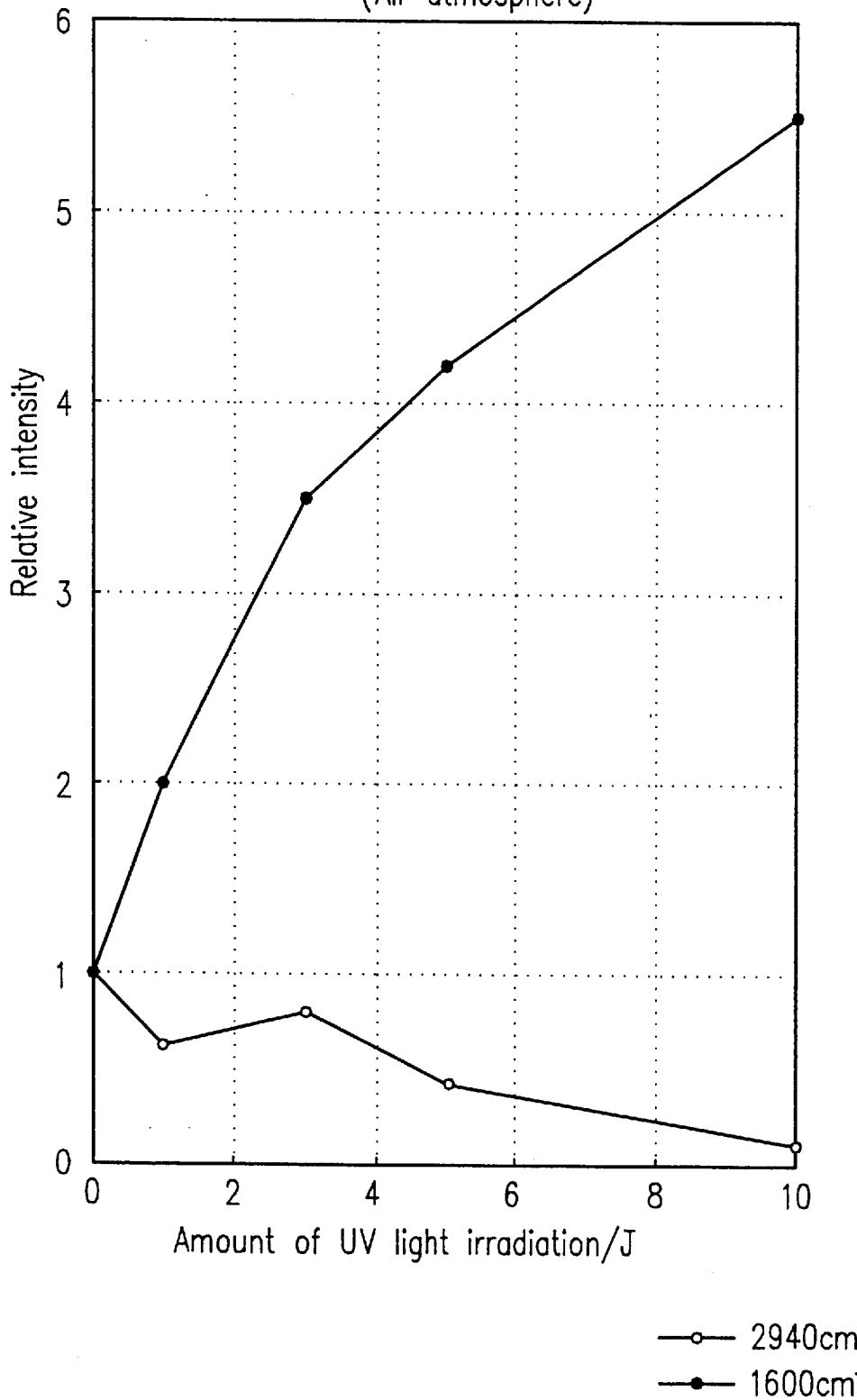
FIG. 3 is a graph showing the relationship between a relative intensity of an absorption band and an amount of UV irradiation in the case where an alignment film is UV-irradiated in an air atmosphere, through a surface analysis by using an FT-IR.
Figure 4:
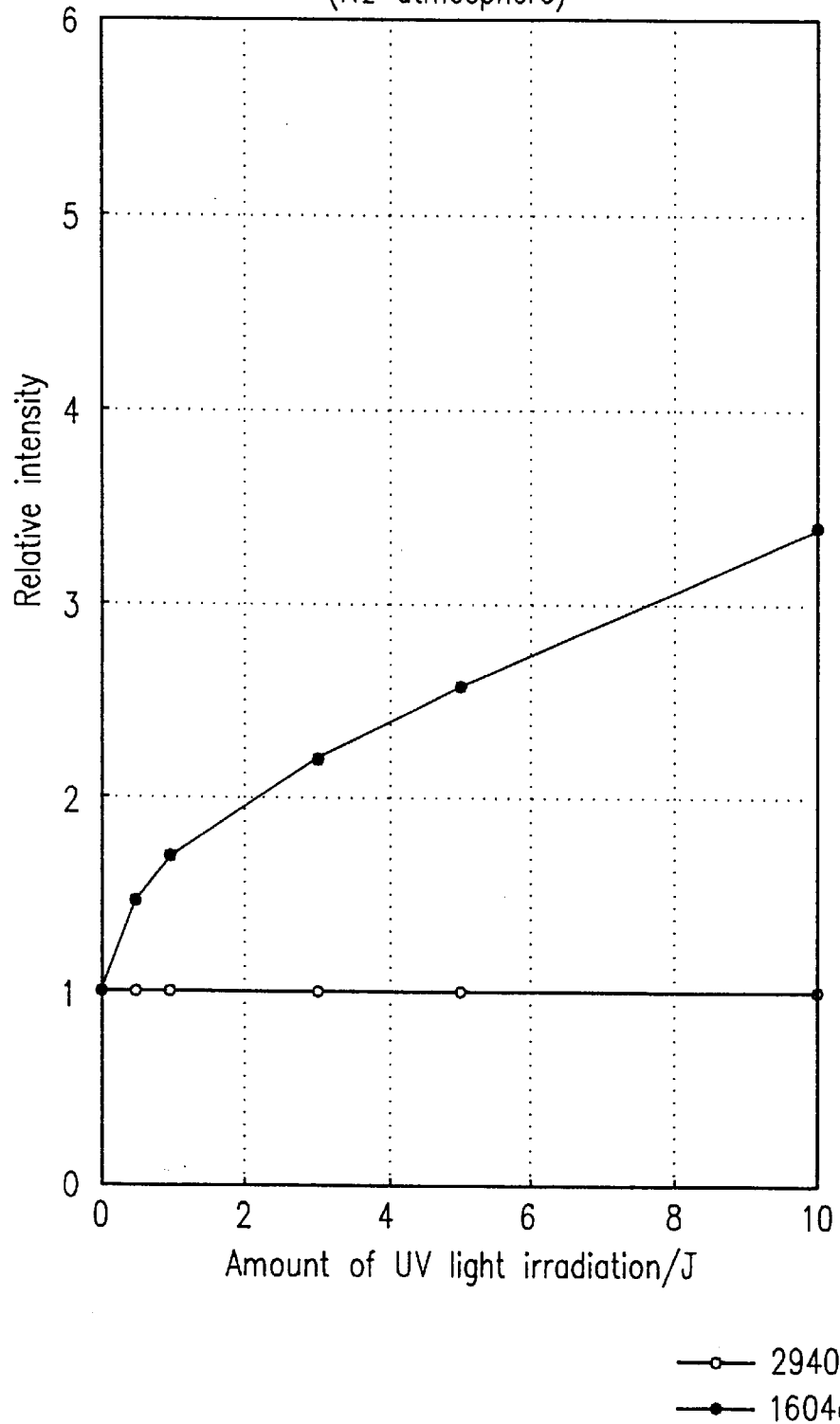
FIG. 4 is a graph showing the relationship between a relative intensity of an absorption band and an amount of UV irradiation in the case where an alignment film is UV-irradiated in a nitrogen atmosphere, through a surface analysis by using an FT-IR.
Figure 5:
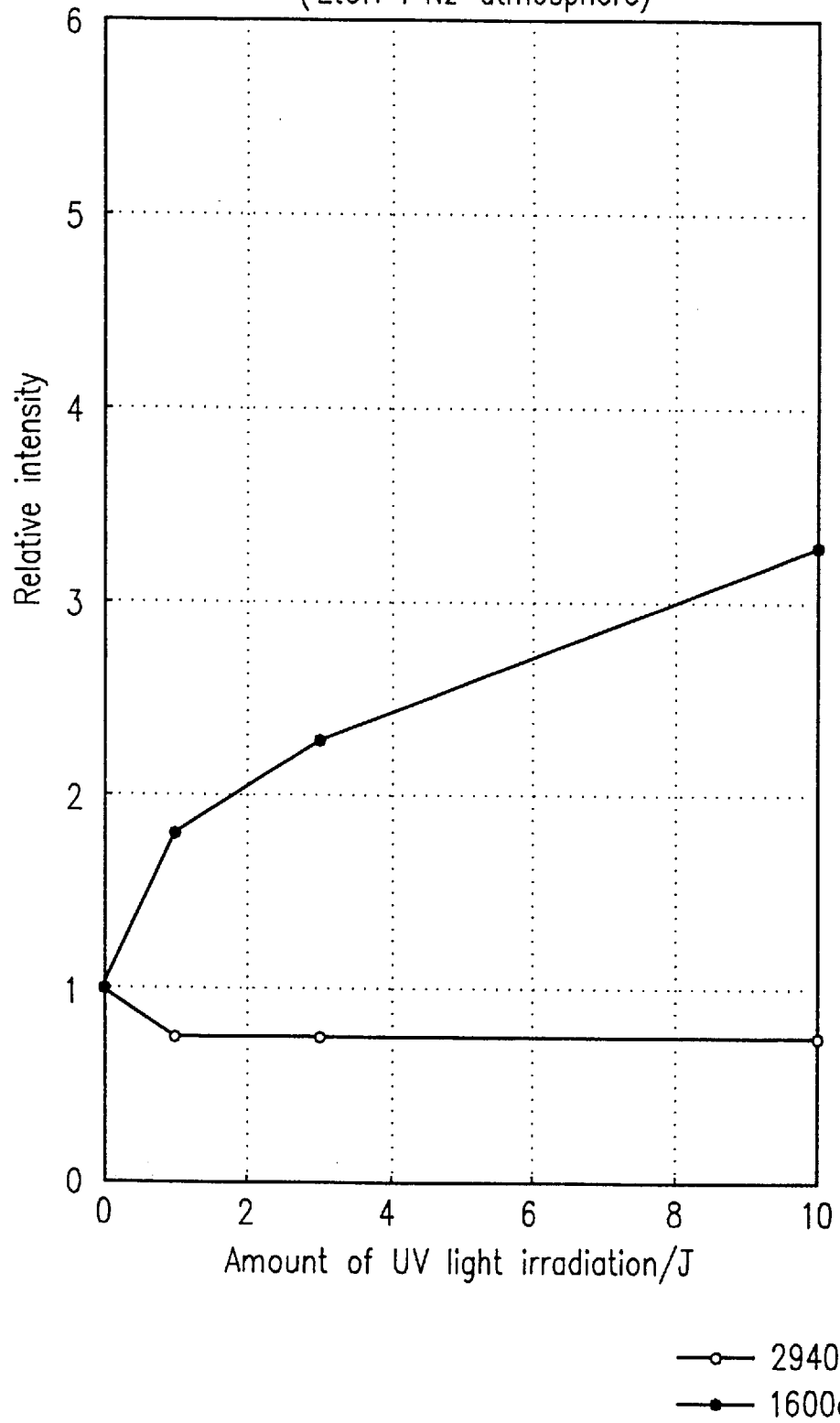
FIG. 5 is a graph showing the relationship between a relative intensity of an absorption band and an amount of UV irradiation in the case where an alignment film is UV-irradiated in an ethanol+nitrogen atmosphere, through a surface analysis by using an FT-IR.

FIGS. 3, 4 and 5 are graphs showing the relationship between the relative intensity of the absorption bands and the amount of UV irradiation. FIGS. 3, 4 and 5 respectively show the cases where the alignment film is UV-irradiated in an atmosphere of air, nitrogen, and ethanol+nitrogen, respectively. In these figures, dots are plotted based on the relative intensity of the absorption bands of the irradiated alignment film (where the intensity of the absorption band of the unirradiated alignment film is normalized to 1) in the y-axis direction and the amount of UV irradiation in the x-axis direction. Herein, the absorption band in the IR spectrum of the functional group which expresses the pretilt angle of liquid crystal molecules is about 2940 $cm^{-1}$ and the absorption band of the functional group considered as causing remaining images is about 1600 $cm^{-1}$.

As shown in FIG. 3, in an air atmosphere, the relative intensity of the absorption band of about 2940 $cm^{-1}$ decreases as the amount of UV irradiation increases. Therefore, the pretilt angle of the liquid crystal molecules is reduced. However, the relative intensity of the absorption band of about 1600 $cm^{-1}$ increases, thereby resulting in remaining images. As shown in FIG. 4, in a nitrogen atmosphere, an increase rate of the relative intensity of the absorption band of about 1600 $cm^{-1}$ is moderate as compared with that in the air atmosphere. However, the relative intensity of the absorption band of about 2940 $cm^{-1}$ is not substantially lowered, whereby a desirable pixel division can not be obtained. On the other hand, as shown in FIG. 5, in an atmosphere of a mixed gas of ethanol and nitrogen, the relative intensity of the absorption band of about 2940 $cm^{-1}$ decreases as the amount of UV irradiation increases, while the increase of the relative intensity of the absorption band of 1600 $cm^{-1}$ is moderate as in the nitrogen atmosphere. Accordingly, by UV-irradiating the alignment film in the ethanol+nitrogen atmosphere, it is possible to promote a photochemical reaction which reduces the pretilt angle of liquid crystal molecules on the alignment film, while a reaction which increases the amount of Vcdc shift is depressed. As can be appreciated from FIG. 5, the amount of UV irradiation which results in a desirable pixel division without generating remaining images is in the range of about 0.5 $J/cm^2$ to about 1 $J/cm^2$. When the amount of UV irradiation is less than about 0.5 $J/cm^2$, the pretilt angle of liquid crystal molecules is not adequately lowered.

Figure 6:
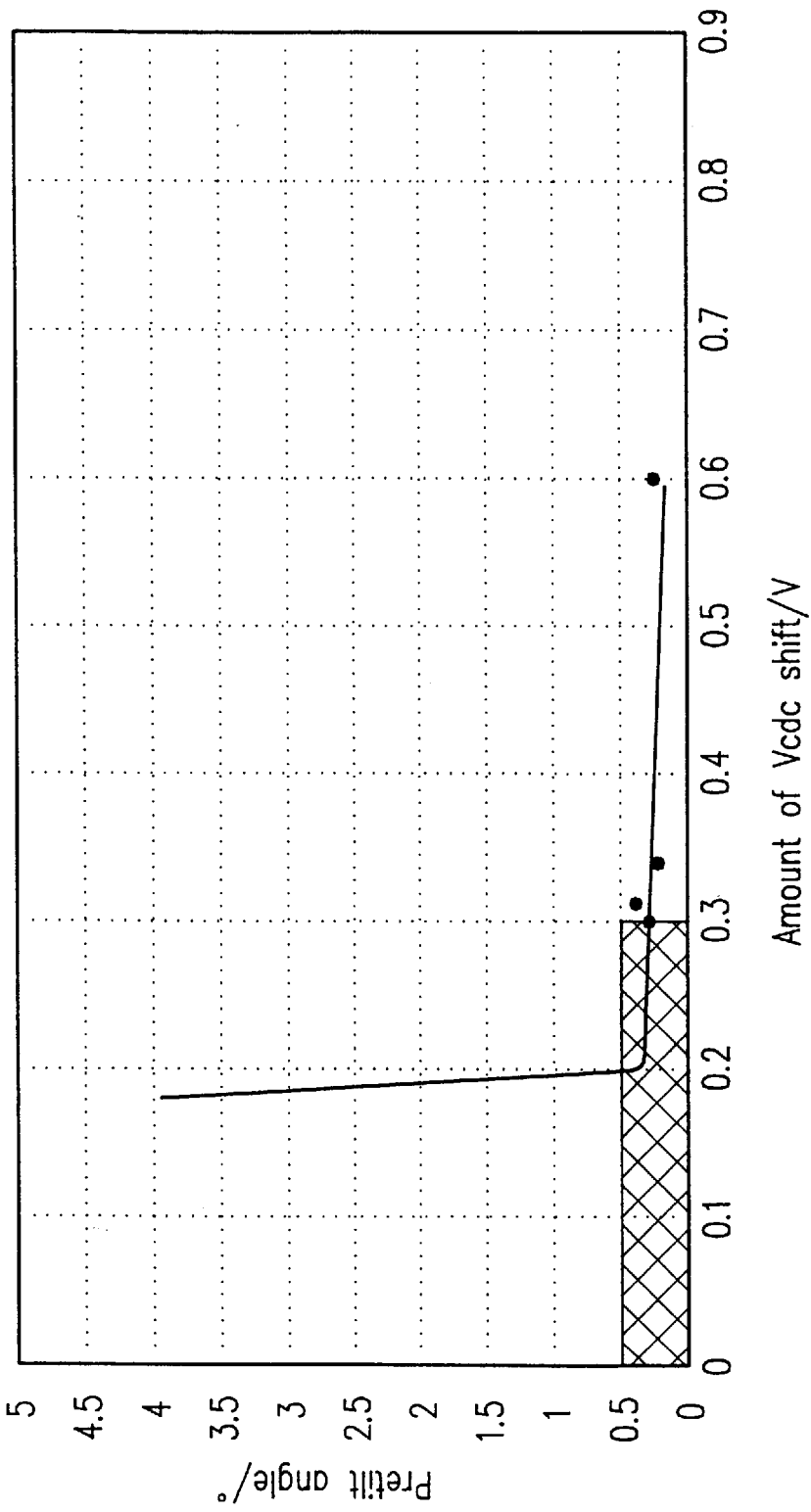
FIG. 6 is a graph showing the relationship between an amount of Vcdc shift and a pretilt angle of the liquid crystal display device in the case where an alignment film is UV-irradiated in an ethanol+nitrogen atmosphere.

FIG. 6 shows the relationship between the amount of Vcdc shift and the pretilt angle in the case where the alignment films are UV-irradiated in an atmosphere of a mixed gas of ethanol+nitrogen.

Preferably, as indicated by the hatched region of FIG. 6, the pretilt angle of the liquid crystal molecules on the irradiated portion of the alignment film is about 0.5° or less for a desirable pixel division and the amount of Vcdc shift thereof is about 0.3 V or less for not generating remaining images.

Hereinafter, an exemplary method for fabricating the liquid crystal display device will be described.

The method described hereinafter is for fabricating, for example, the liquid crystal display device having the structure shown in FIG. 1.

First, the electrode layers 31b and 32b are formed respectively on the base substrates 31a and 32a by a known method. The alignment films 31c and 32c are formed respectively on the electrode layers 31b and 32b.

Figure 7:
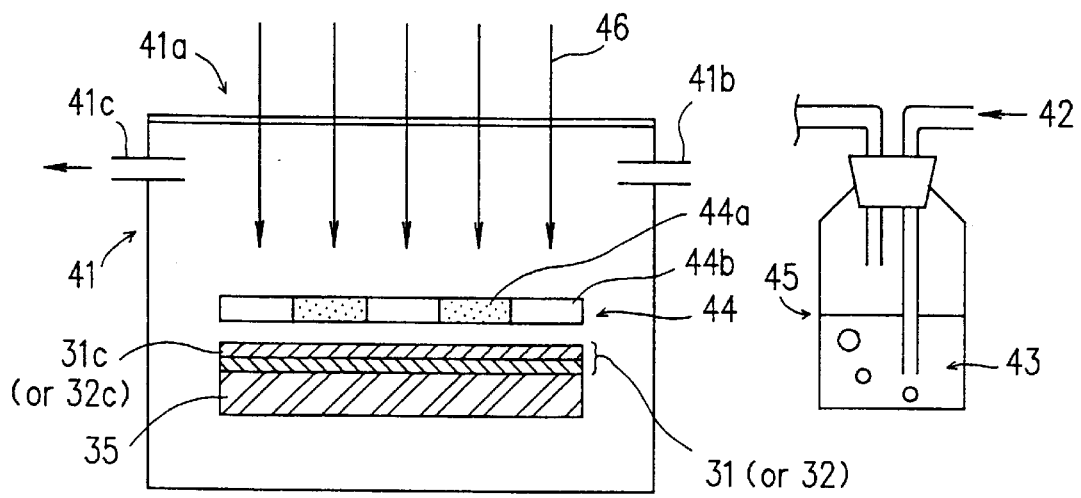
FIG. 7 is a cross-sectional view schematically showing an apparatus for fabricating the liquid crystal display device according to an example of the present invention.

Next, one of the substrates 31 and 32, e.g., the substrate 31 is set on a holding member 35 in a chamber 41 as shown in FIG. 7 with the alignment film 31c thereof facing up. A photomask 44 having light blocking portions 44a and light transmitting portions 44b is placed over the alignment film 31c. The light blocking portions 44a and the light transmitting portions 44b are arranged in a matrix or in stripes in the photomask 44 depending on the arrangement of the electrode layers 31b and 32b.

Figure 8:
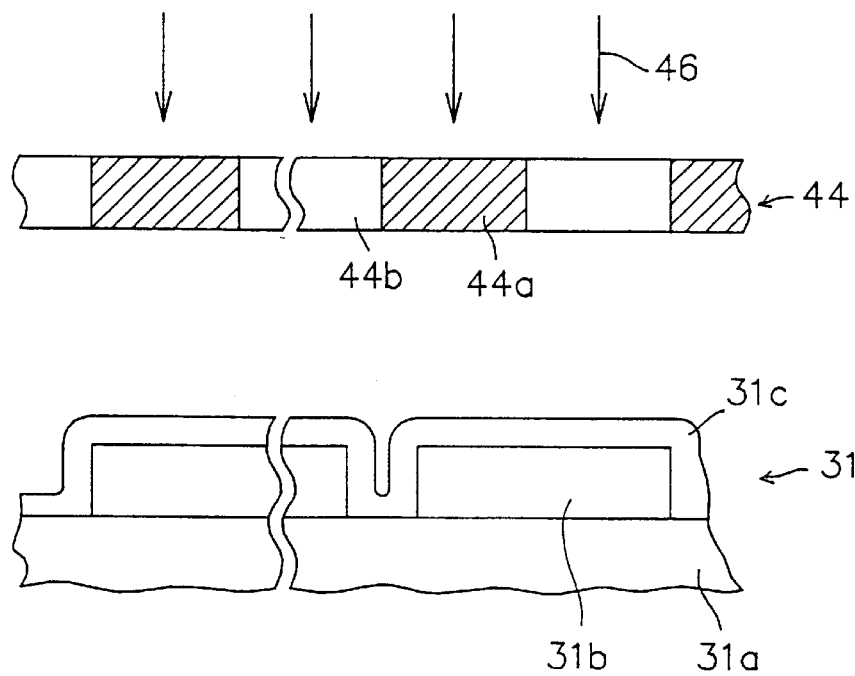
FIG. 8 is a cross-sectional view schematically showing a UV irradiation process in a method for fabricating the liquid crystal display device according to an example of the present invention.
Figure 9:
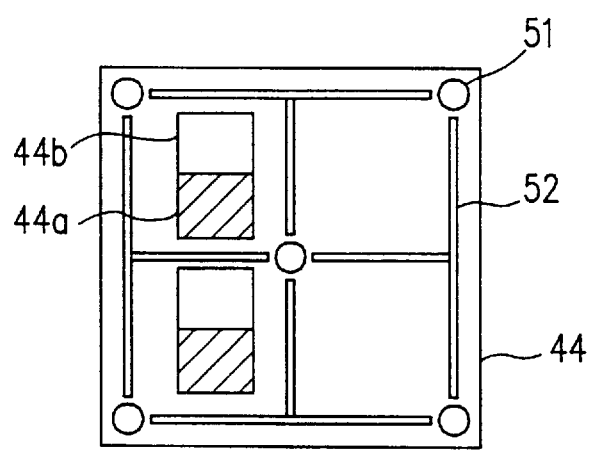
FIG. 9 is a plan view showing a photomask used in the method and the apparatus for fabricating the liquid crystal display device according to the present invention.
Figure 10:
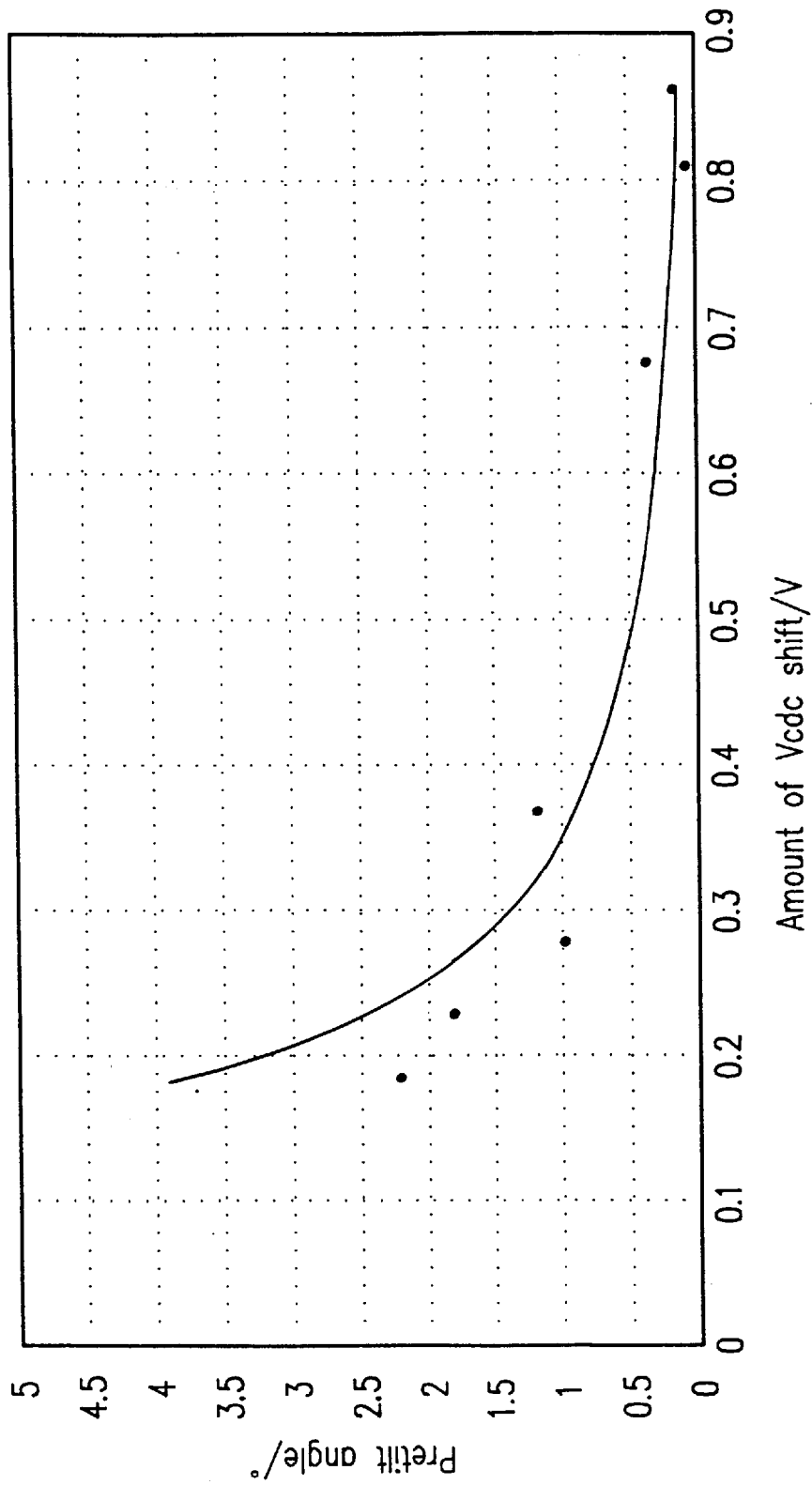
FIG. 10 is a graph showing the relationship between an amount of Vcdc shift and a pretilt angle of the liquid crystal display device in the case where the alignment film is UV-irradiated in an atmosphere of air or nitrogen.

FIG. 8 shows the case where the substrate 31 is set in the chamber 41. The photomask 44 is so placed that the light blocking portion 44a covers one half (left half) of each electrode layer 31b and the light transmitting portion 44b covers the other half (right half) of each electrode layer 31b. Specifically, the light blocking portion 44a is positioned on an area corresponding to the above-described B-alignment portion of the alignment film 31c (see FIG. 1). Furthermore, as shown in a plan view of FIG. 9, the photomask 44 has one or more holes 51 and one or more grooves 52 for leading gas to the substrate 31. Either or both of the holes 51 and the grooves 52 can be provided. Owing to the presence of the holes 51 and the grooves 52, the flow of the gas is not blocked by the photomask 44 but the gas can freely flow to any side of the photomask 44.

Subsequently, a gas is led into the chamber 41 via a container 45. Specifically, a gas 42 containing nitrogen as an inert gas at about 99% by volume is introduced into the container 45 containing ethanol 43 having a purity of about 99% so as to be bubbled therein. The thus obtained nitrogen gas containing ethanol vapor is led into the chamber 41 through an inlet 41b so that the atmosphere in the chamber 41 is replaced thereby. Although the chamber 41 shown in FIG. 7 includes an outlet 41c for the original gas to flow out of the chamber 41, the outlet 41c may not be necessary as long as the atmosphere in the chamber 41 can be replaced and purged by the mixed gas.

Then, the alignment film 31c is irradiated with light 46 through the photomask 44 from above. As the light 46, UV rays can be used. The upper surface 41a of the chamber 41 is made of a material which is capable of transmitting UV rays 46 therethrough. Due to the UV irradiation, the irradiated portion of the alignment film 31c has such a surface as to reduce the pretilt angle of liquid crystal molecules 33a. Consequently, the pretilt angle of the liquid crystal molecules 33a corresponding to the irradiated portion (the A-alignment portion) of the alignment film 31c (or 32c) becomes smaller than the pretilt angle of the liquid crystal molecules 33a corresponding to the unirradiated portion (the B-alignment portion).

Subsequently, the other substrate 32 (or 31) is set on the holding member 35 in the chamber 41 and subjected to the same irradiation as described above. Thus, the pretilt angle of the liquid crystal molecules 33a corresponding to the irradiated portion (the A-alignment portion) of the alignment film 32c (or 31c) becomes smaller than the pretilt angle of the liquid crystal molecules 33a corresponding to the unirradiated portion (the B-alignment portion) thereof.

Then, the alignment films 31c and 32c are subjected to a rubbing treatment using a burnishing cloth or the like. The substrates 31 and 32 are opposed to each other with a gap therebetween, the alignment films 31c and 32c facing each other, and each A-alignment portion facing a B-alignment portion. Afterwards, the substrates 31 and 32 are attached together by sealing the end portions thereof. Then, a liquid crystal material is injected into the gap between the substrates 31 and 32, thereby obtaining the liquid crystal layer 33. Finally, a peripheral circuit such as a driving circuit is externally mounted at the periphery of a display section which performs a display.

According to the above-described method, the alignment films are UV-irradiated in an atmosphere containing about 99% by volume of a mixed gas of ethanol+nitrogen. As a result, a reaction which reduces the pretilt angle is promoted, while a reaction relevant to deterioration of the electrical characteristics can be depressed. The amount of UV irradiation needed to reduce the original pretilt angle of about 5° down to about 0.5° or less is about 1 J/cm$^2$.

According to the method, the air pressure in the chamber is controlled to be in the range of about 0.5 to about 1 atm. Thus, it is possible to promote vaporization of the organic compound to increase the density of the organic compound in the chamber. When the density of the mixed gas is too low, i.e., less than about 0.5 atm, a photochemical reaction is not well promoted. When the density of the mixed gas is over about 1 atm, the vaporization of the organic compound is not promoted. In these cases, it is not possible to promote a photochemical reaction which reduces the pretilt angle, while a reaction which increases the amount of Vcdc shift is depressed.

Nitrogen is used as an inert gas in the above-described method. However, helium, neon or argon can be also used as the inert gas. As described above, an alcohol, especially a lower alcohol such as ethanol, methanol and propanol; primary amine; carboxylic acid; halogenated alkyl (e.g., chloroform or methylene iodide); or a silane coupling agent (e.g, aminoalkylsilane or epoxyalkylsilane) can be used as the organic compound in the present invention. Although the organic compound can be either volatile or non-volatile, a volatile compound is preferable. Air may be used instead of the inert gas, as described above.

Although the gas is externally led into the chamber in the above-described method, a volatile organic compound can be applied directly to the photomask located in the chamber so that the organic compound is vaporized to be around the surface of the alignment film.

Although not mentioned in detail in the above description of the method, a high-pressure mercury lamp, a low-pressure mercury lamp, a mercury xenon lamp, or the like can be used as a light source for the UV irradiation for the alignment film. Alternatively, a laser beam having a wavelength in the range same as a UV ray can be used. The laser beam preferably has a wavelength of about 350 nm or less in order to easily obtain a high energy. In the case where a laser beam is used, it is easy to determine an area to be irradiated, whereby a desired area of the alignment film can be irradiated without using a photomask.

As an alignment film applicable to the present invention, an alignment film made of a polyimide film or other materials can be used. Preferably, the material for an alignment film is such that when the alignment film is UV-irradiated in an inert gas atmosphere, a photochemical reaction which reduces the pretilt angle of liquid crystal molecules is promoted, while a reaction which increases the amount of Vcdc shift is depressed.

In the above description, irradiated portions (A-alignment portions) and unirradiated portions (B-alignment portions) are provided on an alignment film on each substrate so that an A-alignment portion on the upper substrate opposes a B-alignment portion on the lower substrate, and a B-alignment portion on the upper substrate opposes an A-alignment portion on the lower substrate. However, the present invention is not limited thereto. Needless to say, the same effect can be obtained by providing an alignment film having a uniform alignment direction on one substrate while providing an alignment film having A-alignment portions and B-alignment portions on the opposing substrate.

Moreover, the present invention is not limited to a use for an active matrix type liquid crystal display device as described above, but also is applicable to a passive matrix type liquid crystal display device.

Furthermore, in lieu of providing a photomask as described above, a photomask can be patterned directly on an alignment film by employing a photolithography technique, and then removed after the UV irradiation.

As has been described in detail hitherto, the present invention makes it possible to provide a liquid crystal display device in which a pretilt angle can be reduced while reducing an amount of Vcdc shift, and a method and an apparatus for fabricating the same.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
    a first substrate;
    a second substrate;
    a liquid crystal layer interposed between the first substrate and the second substrate;
    a plurality of electrodes for applying a voltage to the liquid crystal layer;
    a first alignment film provided on a surface of the first substrate in contact with the liquid crystal layer;
    a second alignment film provided on a surface of the second substrate in contact with the liquid crystal layer; and
    a plurality of pixels,
    wherein the liquid crystal layer in each of the pixels includes first and second liquid crystal regions,
    pretilt angles of liquid crystal molecules on the first and second alignment films in the first liquid crystal region and the second liquid crystal region differ from each other, the smaller pretilt angle being about 0.5° or less, and
    an amount of Vcdc shift of electric characteristics of the liquid crystal display device is about 0.3V or less, the amount of Vcdc shift being an amount of voltage generated across the liquid crystal layer after a predetermined period of time from an application of a voltage which is set so that a voltage across the liquid crystal layer is 0V.

2. A liquid crystal display device according to claim 1, wherein the first alignment film includes first and second alignment portions providing liquid crystal molecules with pretilt angles different from each other, the pretilt angle of the liquid crystal molecules on the first alignment portion being about 0.5° or less,
    the second alignment film provides liquid crystal molecules with a single predetermined pretilt angle,
    the first liquid crystal region is formed between the first alignment portion and the second alignment film, and
    the second liquid crystal region is formed between the second alignment portion and the second alignment film.

3. A liquid crystal display device according to claim 1, wherein the first alignment film includes first and second alignment portions providing liquid crystal molecules with pretilt angles different from each other, the pretilt angle of the liquid crystal molecules on the first alignment portion being about 0.5° or less, the second alignment film includes a third and a fourth alignment portions giving liquid crystal molecules thereon pretilt angles different from each other, the pretilt angle of the liquid crystal molecules on the third alignment portion being about 0.5° or less, the first liquid crystal region is formed between the first alignment portion and the fourth alignment portion, and the second liquid crystal region is formed between the second alignment portion and the third alignment portion.

4. A liquid crystal display device according to claim 1, wherein the liquid crystal molecules in the first and second liquid crystal regions have an identical twisting direction.

5. A liquid crystal display device comprising:

a first substrate;

a second substrate;

a liquid crystal layer interposed between the first and the second substrates;

a plurality of electrodes for applying a voltage to the liquid crystal layer;

a first alignment film provided on a surface of the first substrate in contact with the liquid crystal layer;

a second alignment film provided on a surface of the second substrate in contact with the liquid crystal layer; and a plurality of pixels, wherein the liquid crystal layer in each of the pixels includes first and second liquid crystal regions, liquid crystal molecules in the first and the second liquid crystal regions have an identical twisting direction, pretilt angles of liquid crystal molecules in the first alignment region and the second alignment region on the first and the second alignment films differ from each other, and the liquid crystal display device is fabricated by a method including the step of irradiating light onto a predetermined area of each of the first and the second alignment films in a gas containing an organic compound, where the pretilt angle of the predetermined area irradiated with light is about 0.5 deg. or lower.

6. A liquid crystal display device according to claim 5, wherein the light irradiation step is conducted under an air pressure in a range of about 0.5 to about 1 atm.

7. A liquid crystal display device according to claim 5, wherein the organic compound is one selected from the group consisting of a lower alcohol, primary amine, carboxylic acid, halogenated alkyl, and a silane coupling agent.

8. A liquid crystal display device according to claim 5, wherein the light irradiation step is conducted using light having a wavelength of about 350 nm or less.

9. A liquid crystal display device according to claim 5, wherein the organic compound is selected from the group consisting of an alcohol, a primary amine, a carboxylic acid, a halogenated alkyl and a silane coupling agent.

10. A method for fabricating a liquid crystal display device comprising:

a first substrate;

a second substrate;

a liquid crystal layer interposed between the first and the second substrates;

a plurality of electrodes for applying a voltage to the liquid crystal layer;

a first alignment film provided on a surface of the first substrate in contact with the liquid crystal layer;

a second alignment film provided on a surface of the second substrate in contact with the liquid crystal layer; and a plurality of pixels, wherein the liquid crystal layer in each of the pixels includes first and second liquid crystal regions, liquid crystal molecules in the first and the second liquid crystal regions have an identical twisting direction, and a pretilt angle of liquid crystal molecules in the first liquid crystal region and the second liquid crystal region on the first and the second alignment films differ from each other, the method comprising the step of irradiating light onto a predetermined area of each of the first and the second alignment films in a gas containing an organic compound, where the pretilt angle of the predetermined are irradiated with light is about 0.5 deg. or lower.

11. A method for fabricating a liquid crystal display device according to claim 10, wherein the light irradiation step is conducted under an air pressure in a range of about 0.5 to about 1 atm.

12. A method for fabricating a liquid crystal display device according to claim 10, wherein the organic compound is one selected from the group consisting of a lower alcohol, primary amine, carboxylic acid, halogenated alkyl, and a silanized coupling agent.

13. A method for fabricating a liquid crystal display device according to claim 10, wherein the light irradiation step is conducted using light having a wavelength of about 350 nm or less.

14. A method for fabricating a liquid crystal display device according to claim 10, wherein the organic compound is selected from the group consisting of an alcohol, a primary amine, a carboxylic acid, a halogenated alkyl and a silane coupling agent.

15. An apparatus for fabricating a liquid crystal display device, comprising:

a chamber for accommodating a substrate provided with an alignment film thereon of the liquid crystal display device; and a gas supplying section for supplying a gas containing an organic compound into the chamber so that the gas is introduced on the alignment film on the substrate, wherein the chamber includes:

a holding section for holding the substrate; and a light transmitting section for externally leading light onto the alignment film on the substrate placed on the holding section.

16. An apparatus for fabricating a liquid crystal display device according to claim 15, wherein the light transmitting section transmits light having a wavelength of about 350 nm or less therethrough.

17. An apparatus for fabricating a liquid crystal display device according to claim 15, further comprising a photomask between the light transmitting section and the holding section, wherein the photomask includes at least one of a hole passing therethrough and a groove running thereon for leading the gas to the substrate placed on the holding section.

18. An apparatus for fabricating a liquid crystal display device according to claim 15, wherein the organic compound is selected from the group consisting of an alcohol, a primary amine, a carboxylic acid, a halogenated alkyl and a silane coupling agent.

* * * * *